United States Patent Office 2,881,027
Patented Apr. 7, 1959

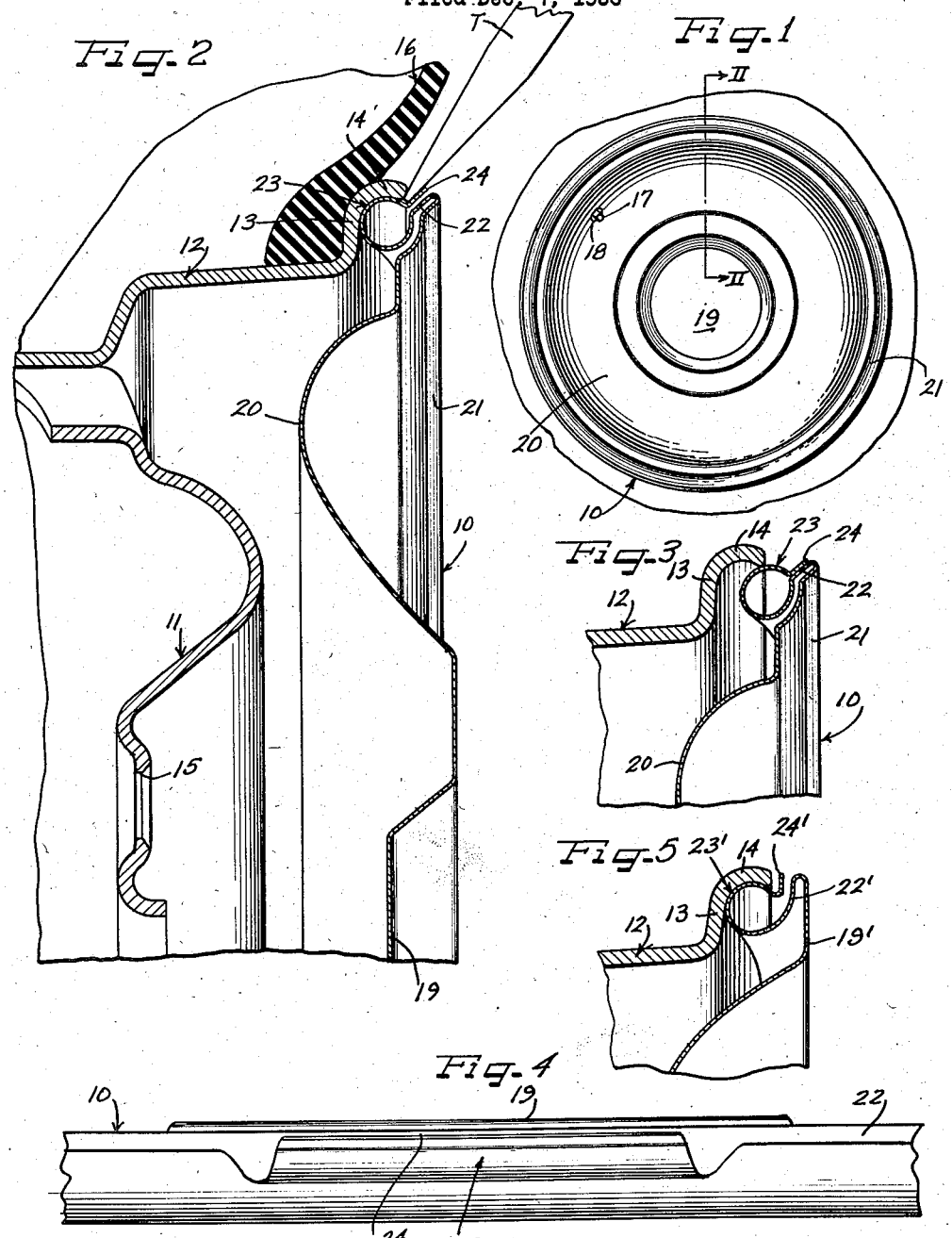

2,881,027

WHEEL COVER

George Albert Lyon, Detroit, Mich.

Application December 7, 1956, Serial No. 626,979

8 Claims. (Cl. 301—37)

This invention relates generally to wheel structures and more particularly to a new and improved wheel cover construction for overlying protective retained disposition upon a vehicle wheel.

More specifically, this invention relates to the provision of a new type of retaining means for a wheel cover member which greatly facilitates in the assembly and removal of the cover upon a vehicle wheel. By the present construction, a minimum amount of force need be applied to the outer side of the cover to engage the cover under resilient tension with the wheel which is occasioned by virtue of the novel construction which efficiently permits the force to be directly applied to the retaining extensions through the cover. Also, the retaining extensions have free terminals which are spaced away from the wheel in such a manner as to allow a pry-off tool to be inserted between the terminal and the wheel so that the retaining extensions and cover may be disengaged from the wheel with a minimum amount of effort.

Accordingly, an object of this invention is to provide a new and improved cover construction which allows the cover to be assembled and removed from the wheel with a minimum amount of effort.

A further object of this invention is to provide retaining extensions for holding the cover in resilient tensioned engagement with a vehicle wheel which extensions are constructed in such a manner as to enable force to be directly applied to the cover extensions through the cover margin.

A still further object of this invention is to provide an ornamental wheel cover member which may be mass produced at low cost and which has retaining means which will effectively maintain the cover on the wheel.

According to the general features of this invention there is provided in a wheel cover having an outer margin provided with circumferentially spaced resiliently deflectable retaining extensions on the underside thereof, the extensions each being looped in cross-section and having a generally radially extending free terminal which is normally spaced from and extends in generally parallel relation to the cover so as the cover is appiled to the wheel the extension will be sprung causing the terminal to abut against the underside of the cover to enable force to be directly applied to the extensions through the cover margin to facilitate assembly of the cover with the wheel.

Other objects and features of the present invention will more fully become apparent in view of the following detailed description taken in conjunction with the accompanying drawings illustrating therein several embodiments and in which:

Figure 1 is a side elevation of my wheel structure;

Figure 2 is an enlarged fragmentary cross-sectional view taken substantially on the line II—II of Figure 1 looking in the direction indicated by the arrows;

Figure 3 is an enlarged fragmentary cross-sectional view similar to Fig. 2 only showing the retaining means biased in assembly of the cover upon the tire rim;

Figure 4 is an enlarged fragmentary edge elevation of wheel cover; and

Figure 5 is an enlarged cross-sectional view similar to Figure 2 only illustrating a modified form of my invention.

A wheel cover 10 according to the present invention is constructed and arranged to be applied in press-on, pry-off relation to the outer side of a vehicle wheel which may be of the conventional type having a disk spider wheel body 11 carrying a multi-flange, drop center tire rim 12 having a radially outwardly extending rim flange 13 merging with and terminating in a curled terminal rim flange 14. The wheel body 11 may be fastened to the axle of an automobile and the like in any suitable manner such as by means of inserting lugs through openings 15 in the wheel body and thereafter threading nuts onto the lugs to clamp the body to the axle in a conventional manner.

The tire rim is adapted to support a pneumatic tire and tube assembly, or a tubeless tire 16 as is shown. The tire 16 may be inflated by injecting air into the valve stem 17 (Fig. 1) which extends through cover opening 18.

The wheel cover 10 in the illustrated embodiments comprises a one piece sheet metal stamped and drawn circular body having a central crown portion 19 for overlying the central portion of the wheel body 11 and merging with an intermediate annular inwardly dished portion 20 from which extends generally radially and axially outwardly an outer annular marginal portion 21 for overlying the tire rim 12.

In the form shown in Figures 1–4 the cover margin, considered by itself, is undulated for reinforcement and to permit retaining means on the underside thereof to move freely with respect to the margin. In Figures 1–4, it will be noted, as opposed to the modification in Figure 5, the cover margin 21, considered by itself, extends in a generally radially and axially outwardly extending direction whereas in Figure 5, the cover margin 19' is flat and extends in a generally radial direction and is not undulated since there is ample clearance for the retaining means.

In both forms of my invention, the margins are underturned and merge with a continuous annular flange 22 and 22' (Figures 2 and 5). At circumferentially spaced intervals and integrally connected to the continuous annular flange are resiliently deflectable retaining extensions indicated generally by the reference numerals 23 and 23' (Figures 2 and 5). In each case, the extensions are of a looped construction and are adapted to nestingly engage when assembled upon the wheel in the groove provided by the arcuate rim flange 14 and which are suitably in each case bottomed against the radial rim flange 13.

In both forms of my invention, the looped portion terminates in a free terminal respectively indicated at 24 and 24'. As will be noted, in both forms of my invention, the free terminal 24 normally extends in generally parallel relation with at least a portion of the annular continuous underturned flange indicated at 22 and 22'. When the cover is in assembly with the wheel the free terminal is normally spaced from the underturned margin so that there will be clearance for the terminal to be flexed axially away from the wheel upon the insertion of a pry-off tool between the tip of the rim flange 14 and the free terminal of the retaining means.

In the assembly of the cover upon the wheel, the valve stem 17 is initially aligned with respect to the cover opening 18 and upon the application of an axially inward force as is shown in Figure 3, the looped portion is biased against the radially inner edge at the tip of the terminal rim flange 14 thereby causing the free terminal of the retaining means to be bottomed against the underside of the cover and more particularly the continuous annular flange so that as further force is applied to the wheel the force may be applied directly to the extensions through the cover margin to facilitate assembly of the cover with a wheel.

Removal of the cover may be brought about by inserting the tool T between the free terminal and the terminal rim flange and upon twisting and applying a suitable pry-off force the looped portion may be disengaged from the tire rim.

The modified form of my cover shown in Figure 5 may be assembled and removed from the wheel in much the same manner. The difference in construction of the two forms shown resides primarily in the angular relation of the free terminal and the cover margin with respect to the tire rim.

It will be understood that modifications and variations may be effected without departing from the scope of the novel concepts of the present invention.

I claim as my invention:

1. A wheel cover having an outer margin provided with circumferentially spaced resiliently deflectable retaining extensions on the underside thereof, said extensions each being looped in cross-section and having a generally radially extending free terminal which is normally spaced from and extends in generally parallel relation to the cover so as the cover is applied to the wheel the extension will be sprung causing the terminal to abut against the underside of the cover to enable force to be directly applied to the extensions through the cover margin to facilitate assembly of the cover with the wheel.

2. A wheel cover having an outer margin provided with circumferentially spaced resiliently deflectable retaining extensions on the underside thereof, said extensions each being looped in cross-section and having a generally radially extending free terminal which is normally spaced from and extends in generally parallel relation to the cover so as the cover is applied to the wheel the extension will be sprung causing the terminal to abut against the underside of the cover to enable force to be directly applied to cover extensions through the cover margin to facilitate assembly of the cover with the wheel, said margin having an underturned continuous annular flange from which the extensions integrally extend and with at least a portion of the annular flange opposite the free terminal normally extending in generally parallel relation therewith, said terminal being movable into and out of engagement with the annular flange.

3. In a wheel structure, a wheel including rim and body parts with the rim having a curled terminal rim flange, a wheel cover for overlying disposition upon the wheel having an outer margin provided with circumferentially spaced resiliently deflectable retaining extensions on the underside thereof, said extensions each looped in cross-section and having a generally radially extending free yieldable terminal which is normally spaced from the rim and the cover and extends normally in generally parallel relation to the cover so as the cover is applied to the wheel the extension will be sprung causing the terminal to abut against the underside of the cover to enable force to be directly applied to the extensions through the cover margin to facilitate assembly of the cover with the wheel and as a result of the free terminal being spaced from the terminal rim flange facilitating removal of the cover from the wheel by permitting a pry-off tool to be inserted therebetween.

4. In a wheel structure, a wheel including rim and body parts with the rim having a curled terminal rim flange, a wheel cover for overlying disposition upon the wheel having an outer margin provided with circumferentially spaced resiliently deflectable retaining extensions on the underside thereof, said extensions each looped in cross-section and having a generally radially extending free yieldable terminal which is normally spaced from the rim and the cover and extends normally in generally parallel relation to the cover so as the cover is applied to the wheel the extension will be sprung causing the terminal to abut against the underside of the cover to enable force to be directly applied to the extensions through the cover margin to facilitate assembly of the cover with the wheel and as a result of the free terminal being spaced from the terminal rim flange facilitating removal of the cover from the wheel by permitting a pry-off tool to be inserted therebetween, said margin having an underturned continuous annular flange from which the extensions integrally extend and with at least a portion of the annular flange opposite the free terminal normally extending in generally parallel relation therewith.

5. In a wheel structure, a wheel including rim and body parts, a wheel cover section for overlying disposition upon the wheel having on the underside thereof circumferentially spaced resiliently deflectable retaining extensions, said extensions having portions in detachable retaining engagement with the wheel, said extensions also having a free yieldable terminal movable as the retaining portion is biased against the wheel into bottomed engagement against the cover portion so as the cover is applied to the wheel the extension will be sprung enabling force to be directly applied to the extensions through the cover portion to facilitate assembly of the cover with the wheel and with said terminal upon assembly of the extensions with the wheel being spaced from the cover margin enabling the cover to be floatingly carried upon the wheel by the extension.

6. In a wheel structure, a wheel including rim and body parts, a wheel cover section for overlying disposition upon the wheel having on the underside thereof circumferentially spaced resiliently deflectable retaining extensions, said extensions having portions in detachable retaining engagement with the wheel, said extensions also having a free yieldable terminal movable as the retaining portion is biased against the wheel into bottomed engagement against the cover portion so as the cover is applied to the wheel the extension will be sprung enabling force to be directly applied to the extensions through the cover portion to facilitate assembly of the cover with the wheel, said free terminal when the cover is in assembly with the wheel being in spaced relation to the wheel enabling a pry-off tool to be inserted thereunder to facilitate removal of the cover from the wheel.

7. In a wheel structure, a wheel including rim and body parts with the rim having a curled terminal rim flange, a wheel cover for overlying disposition upon the wheel having an outer margin provided with circumferentially spaced resiliently deflectable retaining extensions on the underside thereof, said extensions each looped in cross-section and having a generally radially extending free yieldable terminal which is normally spaced from the rim and the cover and extends normally in generally parallel relation to the cover so as the cover is applied to the wheel the extension will be sprung causing the terminal to abut against the underside of the cover to enable force to be directly applied to the extensions through the cover margin to facilitate assembly of the cover with the wheel and as a result of the free terminal being spaced from the terminal rim flange facilitating removal of the cover from the wheel by permitting a pry-off tool to be inserted therebetween, said outer margin and said free terminal when in assembly normally extending radially and axially obliquely away from the wheel to facilitate the receipt of a pry-off tool between the free terminal and the terminal rim flange in removing the cover.

8. In a wheel structure, a wheel including rim and body parts with the rim having a curled terminal rim flange, a wheel cover section for overlying disposition upon the wheel having an outer margin provided with circumferentially spaced resiliently deflectable retaining extensions on the underside thereof normally having an outside diameter, slightly in excess of the terminal rim flange, said extensions each looped in cross-section and having a generally radially extending free yieldable terminal which is normally spaced from the outer tip of the terminal rim flange and from the cover section and extends normally in generally parallel relation to an underneath surface on the cover section so as the cover section is applied to the wheel the extension will be sprung causing the terminal to abut against the underside of the cover section to enable force to be directly applied to the extensions through the cover section margin to facilitate assembly of the cover with the wheel and as a result of the free terminal being spaced from the terminal rim flange facilitating removal of the cover section from the wheel by permitting a pry-off tool to be inserted therebetween and release the tension between the retaining extensions and the terminal rim flange.

References Cited in the file of this patent

UNITED STATES PATENTS

| | | |
|---|---|---|
| 1,706,007 | Van Alstyne et al. | Mar. 19, 1929 |
| 2,624,638 | Lyon | Jan. 6, 1953 |

FOREIGN PATENTS

| | | |
|---|---|---|
| 509,850 | Canada | Feb. 8, 1955 |